United States Patent [19]

Wattron

[11] 4,309,863
[45] Jan. 12, 1982

[54] HARVESTING MACHINE WITH IMPROVED SKIRTS

[75] Inventor: Albert Wattron, Schwenheim, France

[73] Assignee: Belrecolt, Marmoutier, France

[21] Appl. No.: 198,278

[22] Filed: Oct. 17, 1980

[30] Foreign Application Priority Data

Oct. 26, 1979 [FR] France ............................... 79 27105

[51] Int. Cl.³ ............................................. A01D 75/20
[52] U.S. Cl. ..................................... 56/320.1; 56/17.4
[58] Field of Search .................... 56/17.4, 320.1, 320.2, 56/6, 13.6, 192

[56] References Cited

U.S. PATENT DOCUMENTS 3,759,023  9/1973  Comer ................................. 56/320.1
3,772,865  11/1973  Ruprecht et al. ...................... 56/192
4,160,356  7/1979  Mathews .................................. 56/6

FOREIGN PATENT DOCUMENTS 2231624  1/1974  Fed. Rep. of Germany ........ 56/192

Primary Examiner—Paul J. Hirsch
Attorney, Agent, or Firm—Ernest F. Marmorek

[57] ABSTRACT

A harvesting machine includes at least one drum rotatable about an upright axis and open at the bottom, an effective skirt secured to a lower part of the drum, including a first skirt substantially in the shape of a hollow truncated cone, and a second skirt secured to the first skirt and extending therebelow, so that only the second skirt makes operative contact with the ground, at least near the front of the harvesting machine as defined by the forward direction of its movement.

17 Claims, 9 Drawing Figures

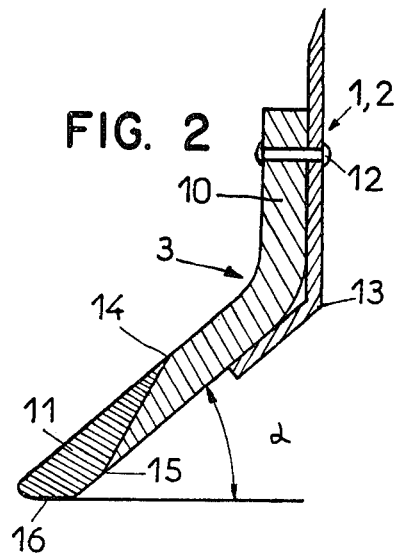
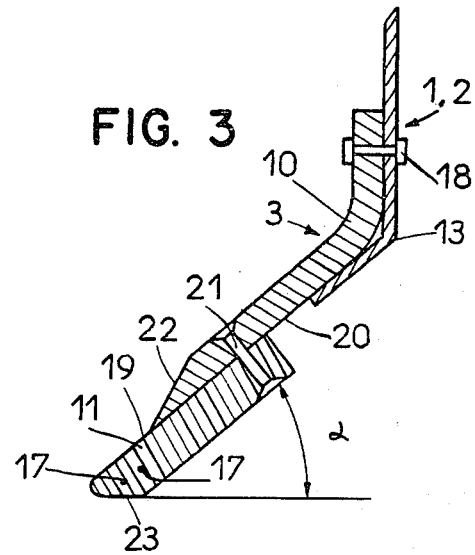
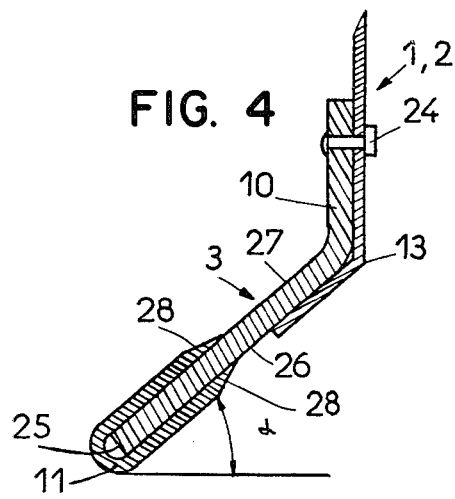
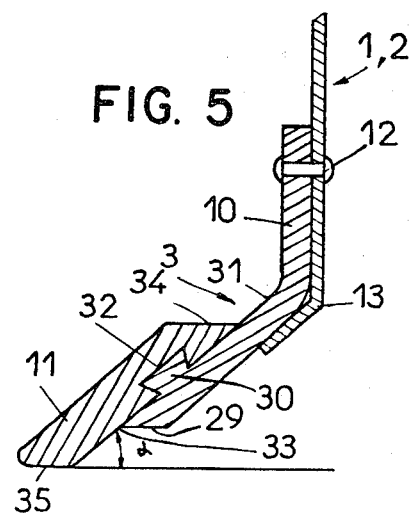

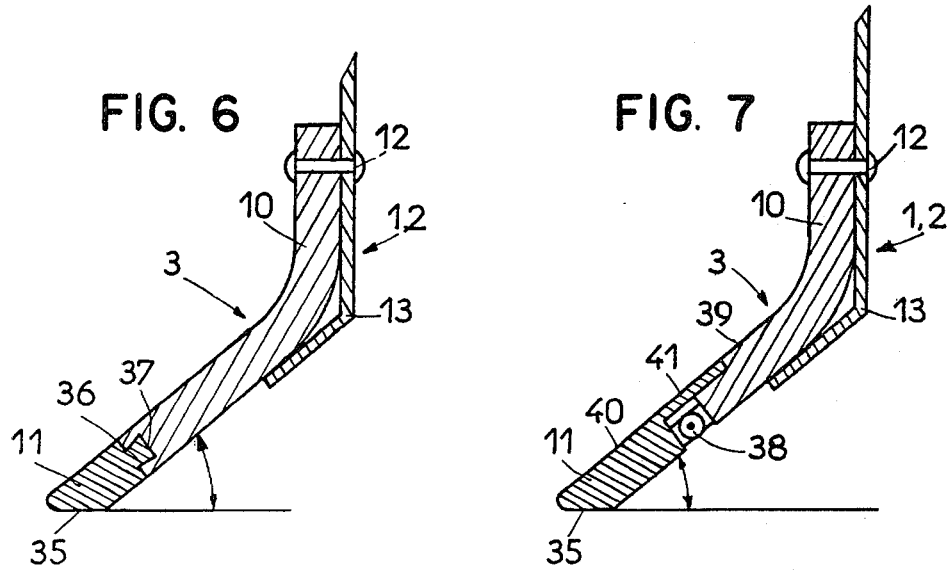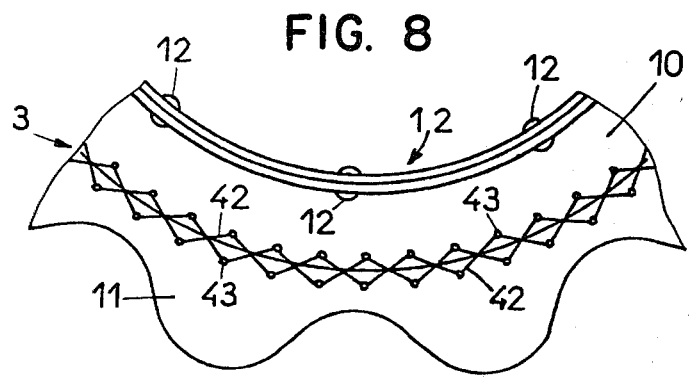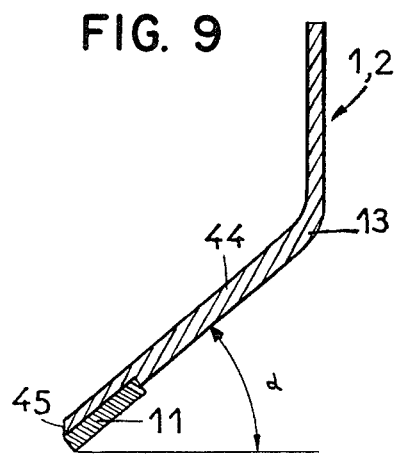

HARVESTING MACHINE WITH IMPROVED SKIRTS

FIELD OF THE INVENTION

The present invention concerns an improvement to skirts of harvesting machines such as, for example, haymaking machines.

BACKGROUND OF THE INVENTION

Certain harvesting machines have one or more drums open at the bottom which are driven so as to rotate about a substantially upright axis. Each of these drums is fitted at its base with a skirt in the form of substantially the shape of a hollow truncated cone.

When a machine of this type is operating, namely, when its drums are being rotated, their skirt, or skirts which is, or are continuously and constantly in contact with the ground, at least at the front of the machine as defined by the forward direction of its movement, pass or passes below the hay on the ground and lift the hay. Depending on the way in which the drums are disposed, it is possible, for example, either to lay hay in swaths, or to ted it.

Machines of this type have the advantage of being devoid of any metal prongs. As a result these machines do not constitute any danger for pick-up balers, forage harvesters or self-loading forage wagons, or the like, for there is no risk of a fragment of a metal prong passing into the hay-processing mechanisms of these machines. Similarly, there is no danger of the livestock swallowing any metal debris arising from a broken prong. Furthermore, the fact that the hay is tedded or laid on swaths by means of a skirt made of a flexible material makes it possible to treat the hay more gently than if it were tedded or laid in swaths with the aid of metal prongs. The hay is then handled less roughly, making it possible to harvest hay of a better nutritive quality. Finally, tedding or laying lay in swaths by means of skirts is less harmful to fresh growth than are metal prongs, favoring the growth of grass or vegetable matter for the following harvest.

However, the harvesting machines described above have the disadvantage that their skirts are relatively expensive. Furthermore, these skirts have parts which wear and have to be replaced several times during the life of the machine.

In fact, while the machines to which they are fitted are operative, the skirts are continuously and constantly in contact with the ground, at least at the front of the machine, as defined by the forward direction of the movement. The drums to which the skirts are attached, are driven so as to rotate, and therefore the skirts constantly rub the ground. This results in a process of wear, which can be minimized by a judicious choice of the material used to make the skirts. However, special materials for the skirts are very costly. Moreover, the skirts are of substantial dimensions, and their replacement is exceptionally expensive; also, some parts of the skirts, in spite of the quality of their material, may still have to be replaced.

SUMMARY OF THE INVENTION

The present invention makes it possible to overcome this drawback by proposing a skirt of which a part in contact with the ground can be changed rapidly, easily and at minimal cost.

In accordance with the invention, the skirt means on each drum is constituted by a first skirt secured to the drum, and to which is attached a second skirt for making contact with the ground while the machine is operative, at least at the front of the machine, as defined by the forward direction of its movement. In accordance with another feature of the invention, the external diameter of the second skirt is at least equal and preferably greater than the external diameter of the first skirt. As a result the second skirt alone is continuously and constantly in contact with the ground, at least at the front of the machine.

Thus, only the second skirt is subject to wear due to its rubbing on the ground, and needs to be made of a material exhibiting good resistance to abrasion. In contrast, the first skirt can be made of a different material from that forming the second skirt. Advantageously, the material of the first skirt may be of a different thickness, of a different rigidity and, generally of a different quality, and less costly than the material of the second skirt.

In accordance with another feature of the invention, provision is made for the second skirt to be attached to the first skirt, preferably with the aid of releasable locking means, advantageously of a relatively rapidly acting type.

The second skirt fitted to the first skirt, in accordance with the invention, and whose internal diameter is at least equal to the external diameter of the first skirt, by virtue of its reduced dimensions, can therefore be priced in line with the fact that it is subject to wear, and can be replaced easily and rapidly without the loss of any of the advantages exhibited by harvesting machines equipped with skirts made in one piece.

Ease of replacement of the second skirt also makes it possible to increase the range of applications of harvesting machines fitted out in accordance with the invention.

In fact, one and the same basic machine can be fitted with various types of external second skirts having different respective characteristics as regards form, rigidity, thickness and/or dimensions for the purpose of performing different tasks.

BRIEF DESCRIPTION OF THE DRAWING

Further features and advantages of the present invention will be apparent from the description below—which is in no way restrictive—of a number of embodiment examples of the invention, and from reference to the attached drawings in which:

FIG. 2 is a radial section through a lower portion of the drum, showing how the second skirt is attached to the first skirt, in a first embodiment of the invention, FIG. 3 is a section similar to FIG. 2 of a second embodiment of the invention, FIG. 4 is a section similar to FIG. 2 of a third embodiment of the invention, FIG. 5 is a section similar to FIG. 2 of a fourth embodiment of the invention, FIG. 6 is a section similar to FIG. 2 of a fifth embodiment of the invention, FIG. 7 is a section similar to FIG. 2 of a sixth embodiment of the invention, FIG. 8 is a partial plan view of a seventh embodiment of the invention, and FIG. 9 is a section similar to FIG. 2 of an eighth embodiment of the invention.

DESCRIPTION OF THE PREFERRED EMBODIMENTS

Figure 1:
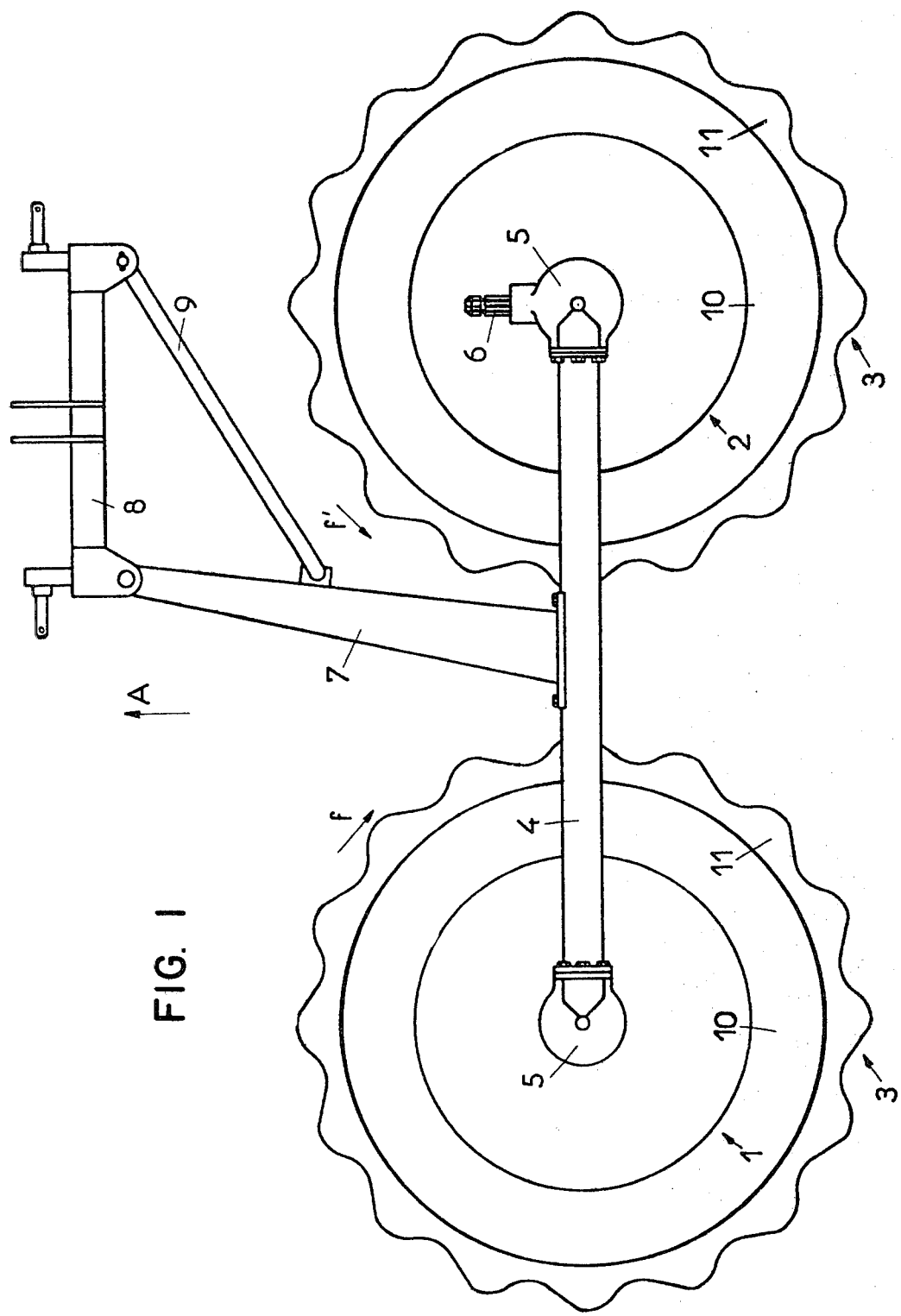
FIG. 1 is a top plan view of a harvesting machine, with two skirts.

Referring now to the drawing, as illustrated in FIG. 1, the harvesting machine equipped in accordance with the invention is of the central swath-laying type having two drums 1 and 2, each fitted in their lower portion with a skirt 3 whose external edge is corrugated. The drums 1 and 2 are linked by a chassis 4 within which there is housed a transmission shaft (not shown) for the purpose of driving the two drums 1 and 2 so as to make them rotate in the direction of the arrows f and f' by virtue of transmission components accommodated by the angular drive casings 5 located above each of the drums 1 and 2. The aforementioned (non-illustrated) transmission shaft may be driven through a (non-illustrated) angular drive unit by means of a splined shaft end 6 which can be attached to the power take-off of a tractor (not shown) by means of a transmission drive.

The chassis 4 is connected to the aforementioned tractor by means of a beam 7, to which there is connected a frame 8 which, once connected to the tractor, allows the machine to be moved in the direction of the arrow A. A bracing strut 9 ensures that the link between the beam 7 and the frame 8 is rigid.

In FIG. 1 it can be seen that the effective skirt or skirt means 3 of each drum 1 and 2 is formed by two skirts 10 and 11 coupled to one another. The interior skirt 10 is attached to the drum 1 or 2 by rivets, or with the aid of screws or any other means, while the external skirt 11, whose external diameter is greater than the external diameter of the first skirt 10, is attached to the first skirt 10 with the aid of means described hereinafter with reference to FIGS. 2 to 9.

FIG. 2 is a partial section—through a radial plane—of one of the drums 1 or 2 and its skirt 3. The first internal skirt 10 of the skirt means 3 is attached to a vertical wall 13 of the drum 1 or 2 with the aid of rivets 12 in the vicinity of its internal side. The first skirt 10 extends downwardly, curving in such a way as to make an angle α close to about 40° with the ground. The external edge 14 of the skirt 10 is bevelled, in order to provide a relatively large area to which the internal side 15, which is also bevelled of the second external skirt 11, may be glued. The external side 16 of the second skirt 11 may also be bevelled, so as to extend substantially parallel to the ground, when account is taken of the angle of inclination α of the effective skirt 3, and so as to facilitate the lifting of the hay or other products being harvested onto the effective skirt 3.

In the embodiment example of the invention shown in FIG. 2, the second skirt 11 is attached to the end of the first skirt 10. The two skirts 10 and 11 extend in line with one another, and are of substantially the same thickness. The skirts 10 and 11 are made of different materials, however. The first skirt 10 is made of a flexible material without any particular strength. This first skirt 10, which is relatively wide, and for which cloth might be used for example, can thus be inexpensively priced. The second skirt 11, located exteriorly, and continuously and constantly in contact with the ground, at least at the front of the machine, as viewed in its direction of advancement, is also made of a flexible material. This material is, for example, more rigid and moreover particularly resistant to abrasion, because it rubs the ground. The material used to make the second skirt 11 can also have the advantage of being tearproof and non-stretchable. This last quality means that the effective skirt 3 of the drums 1 and 2 can preserve its dimensional stability, and the angle α that the effective skirt 3 makes with the ground. In fact, since the second skirt 11 cannot stretch, and is attached to the first skirt 10, the first skirt 10 cannot rise, for example, due to the action of a centrifugally acting force while the drums 1 or 2 are rotating, or fall when the drums 1 or 2 are at a standstill, even if these movements tend to bring about a variation in the external diameter of the first skirt 10. To further reinforce the second skirt 11, metal wires 17 can be employed, for example, which may be concealed in the skirt's interior, as shown in FIG. 3.

In the embodiment example of the invention shown in the FIG. 3, which depicts a sectional view similar to that of FIG. 2, the first skirt 10 of the skirt 3 is also attached in the vicinity of its internal side to the substantially vertical wall 13 of the drums 1 or 2. Here the skirt is secured by means of screws 18 to the upright wall 13 of the drum.

The second skirt 11 is attached to the skirt 10 in such a way that the upper face 19 of the skirt 11 bears on the lower face 20 of the skirt 10. The second skirt 11 is thus disposed below the first skirt 10. The skirts 10 and 11 are attached to one another by means of rivets 21.

To make it easier for the hay to slide onto the effective skirt 3, an external edge 22 of the skirt 10 is bevelled, and is joined to the upper face 19 of the skirt 11 smoothly and without forming any sharp angles.

An external edge 23 of the second skirt 11, which is the only part of the device in contact with the ground, is also bevelled, so as to extend substantially parallel with the ground.

The properties of the materials used to make the skirts 10 and 11 described with reference to the embodiment example in FIG. 3 may be the same as those described with reference to the embodiment examples illustrated in FIG. 2 and the other FIGS.

In the embodiment example shown in FIG. 4, the skirt 10 of the effective skirt 3 is attached through its interior surface to the wall 13 of the drum 1 or 2 with the aid of screws 24, rivets or the like.

In this embodiment example, the external edge 25 of the skirt 10 extends close to the ground without coming into contact with it, however. In fact, the external edge 25 of the skirt 10 is surrounded by the skirt 11 which in effect envelops the external edge 25. To this end, the skirt 11 is attached, by gluing for example, to the lower face 26 of the skirt 10, folded around the external edge 25 of the skirt 10, and then glued to the upper face 27 of the same skirt 10. Instead of being glued to the skirt 10, the skirt 11 could be attached by rivets or by screws with milled heads, so as not to become entangled with hay during operation of the machine.

To make it easier for the hay to slide onto the effective skirt 3, the edges 28 of the skirt 11 are advantageously bevelled, and made to join the lower and the upper faces 26 and 27, respectively of the skirt 10 without forming any sharp angles.

In the embodiment example of the invention shown in FIG. 5, the first skirt 10 of the effective skirt 3 is also attached in the vicinity of its internal side to the substantially upright wall 13 of the drum 1 or 2. Here the effective skirt 3 is attached to the wall 13 with the aid of rivets 12.

In the vicinity of the lower external edge 29 of the first skirt 10 there is disposed a raised strip or band 30 in the form, for example, of a dovetailed wedge, which protrudes from the upper face 31 of the skirt 10. A mating slot 32 is formed in the second skirt 11 on the side of its lower face 33 in the vicinity of its internal upper edge 34. The connection between the two skirts 10 and 11 is produced by engaging the raised band 30 of the skirt 10 in the slot 32 of the skirt 11. The skirt 11 is then attached to the skirt 10. To make it easier for the hay to slide onto the effective skirt 3 shown in FIG. 5, the upper internal edge 34 of the skirt 11 is bevelled and joined to the upper face 31 of the skirt 10 without forming any sharp angles. The external lower edge 35 of the skirt 11, which is the only part in contact with the ground, is also bevelled, and extends substantially parallel to the ground.

The value of the embodiment example shown in FIG. 5 is due to the fact that a worn skirt 11 can be removed and replaced by a new skirt 11 easily and rapidly, this replacement operation being within the skill of any user of the machine. Moreover, the attachment of the skirt 11 on top of the skirt 10 makes it possible, for example, to windrow vegetable debris that is fairly hard, such as vine shoots, for instance. In this case, any wear is not confined to the external edge of the second skirt 11 alone—it also affects its upper face. In the event of the wear being excessive, the skirt 11 can be replaced easily to avoid any damage to the upper face 31 of the skirt 10 attached to the drum 1 or 2.

FIG. 6 shows an embodiment example of the invention in which the external skirt 11 is also attached to the internal skirt 10 through the introduction of a raised strip or band 36 into a mating slot 37 of the skirt 10 of a complementary shape. However, in this embodiment example the raised band 36 and the slot 37 are provided in the end faces of the respective skirts 10 and 11, so that they can be assembled together end to end, namely extending in a line with one another.

FIG. 7 shows a further variant of the invention. In this variant the second skirt 11 is attached to the first skirt 10, itself secured to the wall 13 of the drum 1 or 2, with the aid of rivets 12, by means of releasable locking means, such as a sliding lock 38. This makes for particularly easy and rapid replacement of the skirt 11 whose external lower edge 35 is in contact with the ground.

Protective means, such as a tongue 41 connected to the skirt 11 covers the sliding lock 38, so that the hay can slide over the upper faces 39 and 40 of the skirts 10 and 11 without becoming entangled therewith.

FIG. 8 is a top plan view of another embodiment example of the invention in which the skirt 11 is also very easy to replace. In fact, in FIG. 8 the skirt 11 is attached to the skirt 10 by means of laces 42 passing through holes 43 provided along the external side of the skirt 10, and the interior side of the skirt 11. A tongue similar to the tongue 41 shown in FIG. 7 can cover the laces 42 in order to avoid having the hay becoming entangled with the laces.

This attachment method, which is rather time-consuming to implement, does have the advantage, however, of being very economical.

In FIG. 8 it will be seen that the skirt 10 of the effective skirt 3 is attached to the wall 13 of each drum 1 or 2 with the aid of rivets 12, which is also true in the case of the effective skirts 3 shown in FIGS. 6 and 7.

FIG. 9 is a final variant of the invention. In this variant the wall 13 of the drum 1 or 2 is flared towards the bottom. The second skirt 11 is attached to the skirt 10 by gluing it to the end of the lower flared part 44 of the drum 13, which takes the place in this case of the skirt 10. In this embodiment example of the invention the part 44 of the drum 1, 2, which can be made of a synthetic material, so as to have some flexibility, has an external diameter about equal to the external diameter of the second skirt 11. The lower external edge 45 of the part 44 is bevelled in order to make it easier for the hay to move upwards over the part 44.

It is perfectly obvious that the diverse elements described above with reference to the diverse variants embodying the invention could easily be combined in different ways without exceeding the limits of the invention. Thus, the skirt 11 in FIGS. 4 through 9 could be reinforced with the metal wires 17 shown in FIG. 3, for example. Similarly, the skirt 11 in FIG. 4 could be attached to the skirt 10 with the aid of an assembly of the kind shown in FIGS. 3, 5 or 8, for example. Lastly, the skirt 11 could also be attached over, or under the skirt 10 with the aid of press-studs, or with the aid of adhesive strips of the "Velcro" type.

Finally, in accordance with an additional feature of the invention, it is possible to make the second skirt 11 so as to contain a plurality of parts, which are fitted together by gluing, or by one of the means described above.

Making the skirt 11 in a plurality of parts has the advantage that the size of the mold used to produce it can be reduced, which further cuts the cost of fabricating the skirt 11.

Lastly, given the ease of replacement of the second skirt 11, provision could easily be made for the existence of a number of types of second skirts 11, having, for example, different respective widths, thicknesses, rigidities and external profiles. As each diverse type of a second skirt 11 makes it possible to perform a special task, and as each can be fitted to the first skirt 10 of the same basic machine, the different types of skirts considerably widen the range of application of the machine. Thus, it is possible, for example, to windrow straw, if a special skirt 11, particularly resistant to abrasion, is chosen. It is in fact known that straw can cause a great deal of damage to windrowing devices with flexible skirts which, if they are made in one piece, are ill-suited for this kind of work.

It is also obvious that various improvements, modifications or additions could be made to the embodiment examples described above in an unrestrictive fashion, or that certain elements could be replaced by equivalent elements without exceeding the scope of the present invention.

I claim:

1. A harvesting machine
   comprising in combination:
   at least one drum rotatable about an upright axis and open at the bottom,
   skirt means secured to a lower part of said drum including
   a first skirt substantially in the shape of a hollow truncated cone, and
   a second skirt secured to said first skirt and extending therebelow, whereby only said second skirt makes operative contact with the ground, at least near the front of the harvesting machine as defined by the forward direction of its movement.

2. A harvesting machine as claimed in claim 1, wherein said first skirt has a predetermined external diameter, and said second skirt has a prearranged minimum external diameter at least equal to the predetermined external diameter of the first skirt.

3. A harvesting machine as claimed in claim 1, wherein said second skirt has a prearranged inner diameter, and said first skirt has a predetermined external diameter at least equal to the prearranged inner diameter of said second skirt.

4. A harvesting machine as claimed in claim 1, wherein said first and second skirts are made of different materials.

5. A harvesting machine as claimed in claim 1, wherein said first and second skirts are made of materials having different degrees of rigidity.

6. A harvesting machine as claimed in claim 1, wherein said second skirt is made of a largely non-metallic tearproof material.

7. A harvesting machine as claimed in claim 1, wherein said second skirt is made of a largely non-metallic, non-stretchable material.

8. A harvesting machine as claimed in claim 1, wherein said second skirt is reinforced with additional material.

9. A harvesting machine as claimed in claim 8, wherein said additional material includes metal wires.

10. A harvesting machine as claimed in claim 1, wherein said second skirt is attached to said first skirt near the lower end of said first skirt.

11. A harvesting machine as claimed in claim 10, wherein said second skirt is disposed below said first skirt.

12. A harvesting machine as claimed in claim 1, wherein said first skirt has a lower rim, and said second skirt is attached to the first skirt and is disposed on each side of said lower rim.

13. A harvesting machine as claimed in claim 1 wherein one of said skirts further comprises releasable locking means, and wherein said second skirt is attached to said first skirt with the aid of said releasable lock-in means.

14. A harvesting machine as claimed in claim 13, wherein said releasable locking means is relatively rapidly acting.

15. A harvesting machine as claimed in claim 13, further comprising protective means at least partially covering said locking means.

16. A harvesting machine as claimed in claim 1, wherein said second skirt is made of a plurality of elements.

17. A harvesting machine as claimed in claim 1, wherein said second skirt can be manufactured from materials having differing characteristics, each second skirt made from at least one of said materials being attachable to said first skirt.

* * * * *